the flow velocity of the second fluid, means for measuring, on the one hand, the difference between the temperatures of the mixture of said two fluids $(T_2)$ and of said second fluid $(T_1)$ and, on the other hand, the difference between the temperatures of said first fluid $(T_3)$ and of said mixture, the rate of flow $(D)$ of the first fluid being proportional to the rate of flow $(d)$ of the second fluid and to the quotient of said two temperature differences according to the formula:

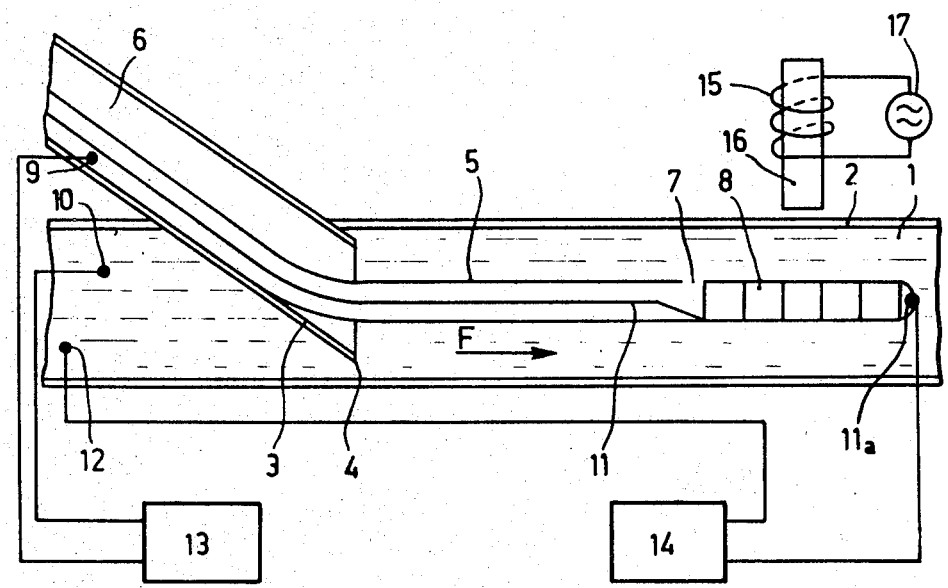

United States Patent Office 3,561,266
Patented Feb. 9, 1971

3,561,266
DEVICE FOR MEASURING THE FLOW VELOCITY OF A FLUID
Michel Auphan, D'Orleans-Neuilly, and Jean Perilhou, Arnoux-Bourg la Reine, France, assignors, by mesne assignments, to U.S. Philips Corporation, New York, N.Y., a corporation of Delaware
Filed July 1, 1968, Ser. No. 741,664
Claims priority, application France, July 10, 1967, 113,761
Int. Cl. G01p 5/10
U.S. Cl. 73—204          9 Claims

ABSTRACT OF THE DISCLOSURE

A device for measuring the rate of flow of blood in the human body comprising first and second paraxial tubes insertable into a blood channel for injecting therein a serum miscible with the blood and for removing a sample of the blood-serum mixture, respectively. Means are provided for measuring the velocity of the serum, and the temperature of the serum, the blood and the blood-serum mixture. An electromagnetic agitator is situated near the end of the second tube to improve the mixing of the blood and the serum.

---

The present invention relates to a device for measuring the flow velocity of a fluid, termed the first fluid, circulating through a more or less uniform duct, more particularly to an improved device for measuring the blood circulation in blood vessels in accordance with the principles set forth in our U.S. Pat. 3,446,073.

Accordingly, the device comprises an injection tube for inserting a second fluid into the duct which is miscible with the first fluid, said tube penetrating into said duct and having at least one aperture near the end which is inside of the duct. In addition, a member is provided for measuring the rate of flow of the second fluid in said injection tube. Means also are provided for determining on the one hand the difference between the temperatures of the mixture of the said two fluids $(T_2)$ and of said second fluid $(T_1)$ and on the other hand the difference between the temperatures of said first fluid $(T_3)$ and of said mixture. The rate of flow $(D)$ of the first fluid is proportional to the rate of flow $(d)$ of the second fluid and to the quotient of said two temperature differences according to the formula:

$$D = d \frac{T_2 - T_1}{T_3 - T_2}$$

Said device may furthermore comprise an absorption tube for accommodating at least part of said mixture. The absorption tube is flexible and passes through said injection tube so that it opens out in the duct in front of the end of the absorption tube, viewed in the direction of flow.

An object of the invention is to increase the precision of the measurements by ensuring a more complete homogenisation of the mixture of the two fluids. According to the invention, the injection tube and the absorption tube are approximately paraxial and the inner tube is flexible. An agitator is arranged at the end of said flexible tube near the aperture of the injection tube in said duct. In a preferred embodiment of the invention the agitator comprises at least one magnet located inside the flexible tube so as to vibrate in response to a magnetic field produced by a circuit outside of the circulation duct of the first fluid. This circuit produces an alternating magnetic field at the end of the tube where the magnet is located.

The invention will now be described in detail with reference to the accompanying drawing which is a schematic sectional view of the device according to the invention.

A vessel 2 or circulation duct contains a first fluid 1, e.g. blood circulating in the direction indicated by the arrow F.

A hollow metal needle 3 penetrates at its lower end 4 into the duct 2. A flexible tube 5 of plastics material, for example, passes through the needle 3 and is passed through the interior of the needle 3 into the duct 2. When it reaches the inner wall of the duct 2 it bends and arranges itself in the direction of the axis of the duct. The needle 3 serves as an injection tube containing a serum 6 or auxiliary fluid. The serum is injected when the length of the tube 5 inside the duct is sufficient. The needle 3 is inserted so that the tube 5 extends in the direction of flow (F) of the blood. The aperture 7 of the tube 5, through which a quantity of the blood-serum mixture enters the tube 5, is located downstream from the aperture 4 in the end of the needle.

According to the invention an agitator 8, preferably a magnet, is provided at the end of the tube 5. In a preferred embodiment shown in the figure, several small magnets are arranged, so that the flexibility of the tube 5 is maintained.

To activate the agitator we provide a magnetic circuit containing a core 16 of soft iron on which is wound a coil 15. The coil in turn is energized by an alternating-current generator 17. The assembly is arranged outside the patient and it produces, when energized, an alternating field at the end of the tube 5. In this manner an agitator is obtained which produces a vibration of the tube which facilitates mixing of the blood and the serum so that a substantially constant average concentration is obtained.

For measuring temperature differences thermocouples 9, 10, 11a and 12 are provided which are used in two assemblies, each having two thermo-couples arranged one opposite the other 9–10 and 11a–12, respectively, and connected each to a voltmeter 13 and 14, respectively.

The voltmeter 13 provides information about the temperature difference $T_1 - T_3$. The voltmeter 14 provides information about the temperature difference $T_2 - T_3$. The formula for the calculation of the flow velocity D of the first fluid is now:

$$D = d \frac{[T_2 - T_3 - (T_1 - T_3)]}{T_3 - T_2}$$

This information and that about the flow of the serum obtained from a flow meter (not shown) can be transmitted to a computer which may be adjusted so that it performs said correct equation.

In the embodiment shown the thermo-element 11a, which is used for measuring the temperature of the mixture $T_2$, is located at the end of the flexible tube since the thermal exchange taking place across the walls may affect the temperature of the mixture inside this tube. A conductor 11, which completes the electrical circuit of the thermocouple 11a, extends through the tube 5. The thermocouples 10 and 12 are usually arranged in the anus.

The invention is not limited to the embodiment described and modifications may be applied within the scope of the invention particularly, the agitator formed by the magnets may be associated in the same manner with the injection tube instead of being arranged in the absorption tube.

What is claimed is:
1. A device for measuring the flow velocity of a first fluid circulating through a duct comprising two substantially paraxial tubes, one tube, termed the injection tube, having an aperture for injecting into the duct a second fluid miscible with the first fluid, the other tube, termed the absorption tube, being flexible, a flow meter for the second fluid in the injection tube, means for determining on the one hand the difference between the temperatures of the mixture and of said second fluid and on the other hand the difference between the temperatures of said first fluid and said mixture, and an agitator provided at the end of said flexible tube near the aperture of the injection tube in said duct.

2. A device as claimed in claim 1, wherein the agitator means comprises, at least one magnet located inside said flexible tube, and an electromagnetic circuit located outside of the channel so as to produce an alternating magnetic field at the end of said tube.

3. A device as claimed in claim 2 wherein the electromagnetic circuit outside of the channel comprises a core of soft iron on which is wound a coil that is connected to an alternating current generator.

4. A device for measuring the rate of flow of a first liquid circulating in a channel comprising, a first thin tube insertable through a wall of said channel and having an aperture for injecting into the channel a second liquid at a temperature $T_1$ and which is miscible with the first liquid, a second thin flexible tube adapted to be insertable longitudinally within said channel, means for measuring the rate of flow of the second liquid within the first tube, means for sensing the temperature $T_1$ of the second liquid, the temperature $T_2$ of the mixed liquids and the temperature $T_3$ of the first liquid, means for determining the difference between the temperatures $T_2$ and $T_1$ and between the temperatures $T_3$ and $T_2$ of the liquids, and agitator means located near the end of the flexible tube that is insertable in the channel.

5. A device as claimed in claim 4 wherein said second tube is coaxially arranged within said first tube and is insertable into the channel via said aperture in the first tube.

6. A device as claimed in claim 5 wherein said agitator means comprises, a plurality of small magnets located within said flexible tube at the end that is insertable within the channel, and means located outside of said channel in the vicinity of the magnets for producing an alternating magnetic field that acts on the magnets.

7. A device as claimed in claim 5 wherein the agitator means is located within said flexible tube at the end that is insertable within the channel, and wherein said means for sensing the temperature $T_2$ of the mixed liquids comprises a thermocouple element mounted near the insertable end of the flexible tube.

8. A device as claimed in claim 5 wherein said temperature determining means comprises, an electrical device connected to said temperature sensing means and adapted to measure and indicate the temperature difference $T_2-T_1$ and the temperature difference $T_3-T_2$.

9. A device as claimed in claim 5 wherein said agitator means comprises, an element that is responsive to a magnetic field and located within said flexible tube at the insertable end thereof, and means located outside of the channel in the vicinity of said element for producing an alternating magnetic field that acts on the element.

References Cited

UNITED STATES PATENTS 3,446,073   5/1969   Auphan et al. _____ 73—204

JAMES J. GILL, Primary Examiner

J. K. LUNSFORD, Assistant Examiner

U.S. Cl. X.R.

128—2.05